(12) United States Patent
Parker et al.

(10) Patent No.: US 6,206,339 B1
(45) Date of Patent: Mar. 27, 2001

(54) ROTARY FUEL FILLER VALVE ACTUATOR

(75) Inventors: Eric G. Parker, Chicago; Craig L. Simdon, Des Plaines, both of IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/411,953

(22) Filed: Oct. 4, 1999

(51) Int. Cl.[7] .............. F16K 31/05; F16K 35/00
(52) U.S. Cl. ............ 251/129.03; 251/95; 251/115; 251/294
(58) Field of Search .................. 251/89, 90, 92, 251/93, 95, 98, 101, 107, 108, 111, 114, 115, 129.03, 129.11, 129.12, 14, 294; 141/312, 301

(56) References Cited

U.S. PATENT DOCUMENTS

| | | | |
|---|---|---|---|
| 3,308,850 | * | 3/1967 | Gill ................................ 251/294 X |
| 3,373,894 | * | 3/1968 | Johnson ........................... 251/98 X |
| 4,512,547 | * | 4/1985 | Balch .............................. 251/115 |
| 4,776,563 | * | 10/1988 | Pascall ........................ 251/129.03 |
| 4,844,407 | | 7/1989 | Baker . |
| 4,921,207 | | 5/1990 | Baker . |
| 5,042,366 | | 8/1991 | Eriksson et al. . |
| 5,046,376 | | 9/1991 | Baker . |
| 5,235,866 | * | 8/1993 | Truman et al. ................ 251/294 X |
| 5,263,449 | * | 11/1993 | Swartzendruber ............. 251/294 X |
| 5,372,351 | | 12/1994 | Oliver . |
| 5,484,133 | | 1/1996 | Oliver . |
| 5,485,869 | | 1/1996 | Haynes . |
| 5,547,164 | | 8/1996 | Ratnik et al. . |
| 5,699,994 | | 12/1997 | Wu . |
| 5,901,760 | * | 5/1999 | Parker et al. .................... 141/312 |
| 5,931,206 | * | 8/1999 | Simdon et al. .................. 141/312 |

* cited by examiner

*Primary Examiner*—Kevin Shaver
*Assistant Examiner*—Eric Keasel
(74) *Attorney, Agent, or Firm*—John P. O'Brien; Mark W. Croll; Donald J. Breh

(57) ABSTRACT

A rotary valve actuator for actuating a valve pivotally disposed in a housing and movable between first and second positions. The actuator includes an actuator member coupled to the valve, a resilient arm coupled to one of the housing or the actuator member, and a wall member protruding from the one of the housing or the actuator member to which the resilient arm is not coupled. An arm tab protruding from the resilient arm is aligned with and preferably protrudes through an opening of the wall member when the valve is in the first position, and an arm engagement member of the resilient arm is engaged with a wall engagement portion of the wall member when the valve is in the first position. The resilient arm is flexible away from the wall member to disengage the arm engagement member from the wall engagement portion. The actuator is operable remotely by one or more flexible straps coupled to the actuator member.

20 Claims, 2 Drawing Sheets

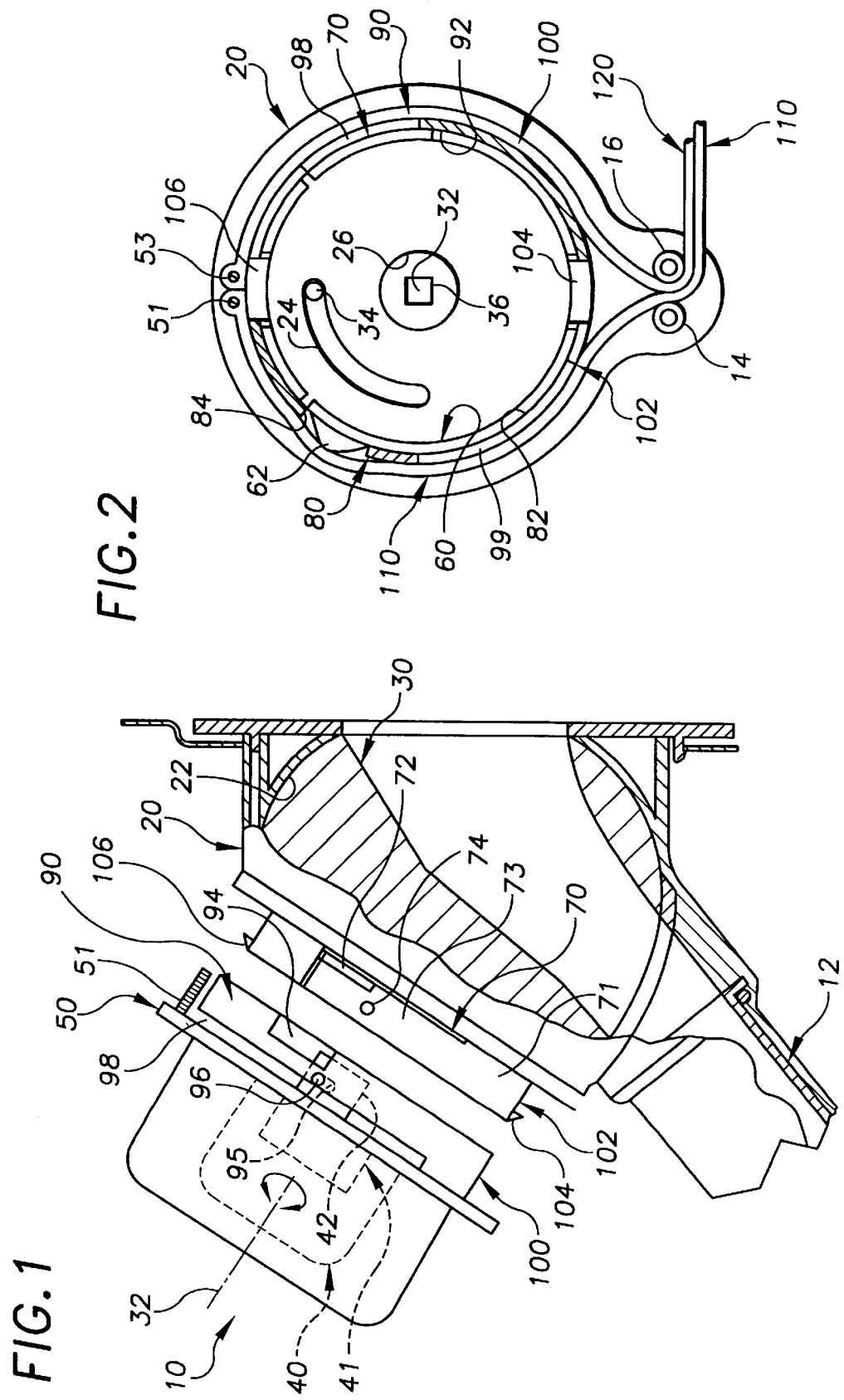

ROTARY FUEL FILLER VALVE ACTUATOR

CROSS REFERENCE TO RELATED APPLICATIONS

The present application is related to U.S. application Ser. No. 08/991,793 entitled "Automotive Fuel Filler Pipe Ball Valve Assembly" filed on Dec. 12, 1997, now U.S. Pat. No. 5,901,760, and continuation-in-part U.S. application Ser. No. 09/062,519 entitled "Automotive Fuel Filler Pipe Valve Assembly" filed on Apr. 17, 1998, now U.S. Pat. No. 5,931,206, both assigned commonly herewith and incorporated herein by reference.

BACKGROUND OF THE INVENTION

The invention relates generally to rotary valve actuators, and more particularly to actuators for rotary fuel filler valves and combinations thereof.

Rotary valves having a valve pivotally disposed in a housing are known generally. The referenced U.S. application Ser. No. 09/062,519 entitled "Automotive Fuel Filler Pipe Valve Assembly", for example, discloses an automotive fuel filler pipe rotary valve assembly comprising generally a housing having a valve pivotally disposed in a valve receptacle thereof. The housing disclosed in the referenced U.S. application Ser. No. 09/062,519 may be mounted in an automotive body panel and coupled to a fuel filler pipe extending from an automotive fuel tank. The valve disclosed in the referenced U.S. application Ser. No. 09/062,519 has a passage therethrough and is pivotally actuatable in the housing to open and close access to the automotive fuel filler pipe, which in one preferred embodiment has a flap valve biased to seal the filler pipe. In another embodiment, the valve itself seals the filler pipe without the necessity of the flap valve, as is common with other rotary valves.

The rotary valve assembly disclosed in the referenced U.S. application Ser. No. 09/062,519 is opened and closed automatically by an electric motor that pivots the valve within the housing. In the rotary valve assembly of U.S. application Ser. No. 09/062,519 it is generally desirable to provide an actuator override that permits manually opening and closing the valve without the motor. It is also desirable to provide manual rotary valve actuators in other rotary valves irrespective of the existence of an automatic or motor driven actuator.

The present invention is drawn to actuators for rotary valve assemblies and combinations thereof.

An object of the invention is to provide novel actuators for rotary valves and combinations thereof that overcome problems in the art Another object of the invention is to provide novel actuators for rotary valves and combinations thereof that are reliable and economical.

Another object of the invention is to provide novel actuators for rotary valves and combinations thereof that are operable manually.

Another object of the invention is to provide novel actuators for rotary valves that are operable remotely from the rotary valve.

A further object of the invention is to provide novel manual actuators for rotary valves and combinations thereof that are useable to override motor driven actuators.

A more particular object of the invention is to provide novel rotary valve actuators for actuating valves pivotally disposed in housings and movable between first and second positions, comprising generally an actuator member coupled to the valve, a resilient arm coupled to one of the housing or the actuator member, and a wall member protruding from the one of the housing or the actuator member to which the resilient arm is not coupled. An arm tab protruding from the resilient arm is aligned with and preferably protrudes through an opening of the wall member when the valve is in the first position, and an arm engagement member of the resilient arm is engaged with a wall engagement portion of the wall member when the valve is in the first position. The resilient arm is flexible away from the inner side of the wall member to disengage the arm engagement member from the wall engagement portion, whereby the valve is movable from the first position to the second position.

Another more particular object of the invention is to provide novel rotary valve actuators for actuating rotary fuel filler valves having a valve pivotally disposed in a housing and movable between first and second positions, comprising generally a first strap coupled to the valve and disposed about a pivot axis thereof in a first direction, a second strap coupled to the valve and disposed about the pivot axis thereof in a second direction, a resilient arm coupled to one of the housing or the valve, and a wall member coupled to the one of the housing or the valve to which the resilient arm is not coupled. An arm tab of the resilient arm protrudes through an opening of the wall member, and an arm engagement member of the resilient arm is engaged with a wall engagement portion of the wall member when the valve is in the first position. The first strap is disposed about the wall member and is engageable with the arm tab to disengage the arm engagement member from the wall engagement portion, whereby the valve is pivotable from the first position to the second position.

These and other objects, aspects, features and advantages of the present invention will become more filly apparent upon careful consideration of the following Detailed Description of the Invention and the accompanying Drawings, which may be disproportionate for ease of understanding, wherein like structure and steps are referenced generally by corresponding numerals and indicators.

BRIEF DESCRIPTION OF THE DRAWINGS

FIG. 1 is an unassembled partial sectional view of a rotary valve actuator according to an exemplary embodiment of the present invention.

FIG. 2 is a partial sectional view of an exemplary rotary valve actuator in a first position.

DETAILED DESCRIPTION OF THE INVENTION

Figure 3:
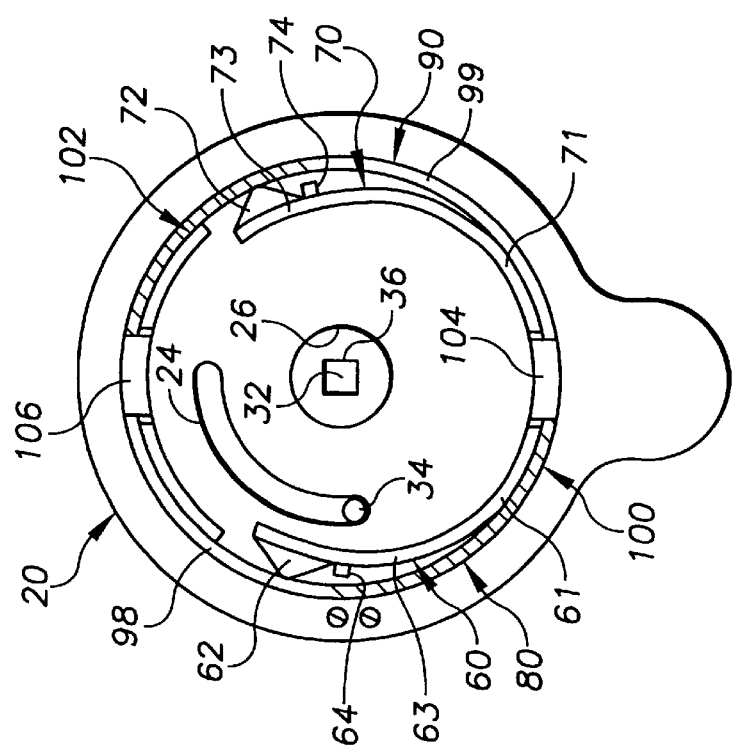
FIG. 3 is a partial sectional view of an exemplary rotary valve actuator in a second position.

FIG. 1 illustrates an exemplary rotary valve 10 having an actuator according to an exemplary embodiment of the invention. The rotary valve is in the form of a fuel filler valve coupled to an automotive fuel filler pipe 12, and comprises generally a housing 20 having a valve 30 disposed in a receptacle 22 thereof. The valve is pivotal about a pivot axis 32 between first and second positions in the housing, for example to open and close access to the fuel filler pipe. In FIGS. 2 and 3, a pin 34 protruding from the valve and through a slot 24 in the housing limits pivotal rotation of the valve within the housing between the first position and the second position, illustrated in FIGS. 2 and 3, respectively. Rotary fuel filler valves of the exemplary type are discussed more fully in the referenced U.S. Application Ser. No. 09/062,519 entitled "Automotive Fuel Filler Pipe Valve Assembly" incorporated herein by reference.

In FIGS. 2 and 3, the housing 20 also comprises a valve access opening 26 through which the valve or a coupling portion thereof is accessible and engagable by the actuator for pivotal operation of the valve. In the exemplary embodiment of FIG. 1, the fuel filler valve also comprises a powered valve actuator in the form of a drive motor 40 mounted on the housing and coupled to the valve 30 by a rotatable drive member 42. In the exemplary embodiment of FIGS. 2 and 3, the rotatable drive member 42 of FIG. 1 is coupled to an engagement portion 36 of the valve 30 accessible through the valve access opening 26. The drive member 42 is not necessarily coupled directly to the motor, but may be coupled thereto for example by a gearing mechanism that reduces the motor output and/or to prevents rotation of the valve when the motor does not operate.

More generally, the rotary valve actuators of the present invention are suitable for use with any rotary valve having a valve disposed in a housing and pivotal therein between first and second positions. In some applications for example the rotary valve is actuated manually, and thus alternative embodiments of the rotary valve may not include a drive motor. Other embodiments do not include the pin 34 protruding from the valve through the housing slot 24 to limit pivotal rotation of the valve therein, or include other means for this purpose.

The rotary valve actuator comprises generally an actuator member coupled to the valve, and in the exemplary embodiment of FIG. 1 the actuator member comprises a plate member 50 coupled to the valve 30 by the drive member 42. The motor 40 is mounted on the plate member 50 and interconnects the plate member to the drive member 42. The plate member 50 remains stationary relative to the housing 20 during operation of the valve 30 by the motor 40. More particularly, operation of the motor 40 rotates the drive member 42 relative to the stationary plate member 50, thereby pivoting the valve in the housing. During motor override operation, however, the plate member 50 and drive member 42 are rotated in unison relative to the housing to pivot the valve therein. A gearing mechanism 41 between the no motor 40 and the drive member 42 prevents relative movement between the plate member 50 and the drive member 42. The actuator of the exemplary embodiment thus overrides the drive motor, which is useful in motor driven automotive fuel filler rotary valves, among many other applications, where a manual valve override is desired.

In other embodiments, the plate member 50 may be coupled directly to the drive member 42 and thus to the valve 30 without the motor 40 and gear mechanism 41 interconnection therebetween, for example in embodiments where motor valve actuation is not required. Alternatively, the actuator member may be a lever arm coupled to the coupling portion of the valve and extending radially from the pivot axis 32 thereof, whereby the valve is pivoted in the housing upon pivotal movement of the lever arm about the axis.

In the exemplary embodiment of FIGS. 2 and 3, the rotary valve actuator comprises a first resilient arms 60 coupled to the housing 20. Alternatively, the first resilient arm may be coupled to the valve, for example by the actuator member. The first resilient arm comprises generally a first arm tab 62 protruding outwardly therefrom and a first arm engagement member also protruding outwardly therefrom. In the exemplary embodiment, illustrated in FIG. 3, the first arm engagement member is separate from the first arm tab 62 and is in the form of a first pin 64 protruding outwardly from the first resilient arm 60. Alternatively, the arm tab and the arm engagement member are formed as a unitary member.

The exemplary valve actuator of FIGS. 2 and 3 also comprises a second arm 70 coupled to the housing 20. Alternatively, the second resilient arm may also be coupled to the valve. The second resilient arm 70 comprises generally a second arm engagement member 74 protruding outwardly therefrom. In some embodiments, the second resilient arm also comprises a second arm tab 72 protruding therefrom, as illustrated in FIGS. 1 and 3, but the second arm tab is not required in the exemplary application and thus not illustrated in FIG. 2.

In FIGS. 2 and 3, the first resilient arm 60 extends in a first direction about the valve pivot axis 32, and the second resilient arm 70 extends in a second direction, opposite the first direction, about the pivot axis. More particularly, in FIG. 3, the first resilient arm 60 has a fixed end portion 61 coupled to the housing 20 and a flexible end portion 63 extending therefrom in the first direction about the pivot axis 32, which is clockwise as illustrated in the exemplary embodiment. The second resilient arm 70 also has a fixed end portion 71 coupled to the housing 20 and a flexible end portion 73, also shown in FIG. 1, extending therefrom in the second, counter-clockwise direction about the pivot axis 32 as viewed in FIG. 3.

In the exemplary motor driven rotary valve embodiment, it is desirable for the first and second resilient arms 60, 70 to extend about the pivot axis 32 in opposite directions to prevent unintentional rotation of the actuator member 50, as discussed further below. In other embodiments however it may be acceptable for the resilient arms to extend about the pivot axis in the same direction, and in some embodiments only one resilient arm is required.

The valve actuator also comprises generally first and second wall members protruding from the other of the housing or the actuator member to which the first and second resilient arms are not coupled. In the exemplary embodiment, first and second wall members 80, 90 protrude from the actuator member, and more particularly from the plate member 50 thereof. The second wall member 90 is illustrated in FIG. 1. In FIGS. 2 and 3, the first and second arms 60,70 are located adjacent corresponding inner sides 82,92 of the first and second wall members 80, 90, respectively.

In FIG. 2, the first wall member 80 comprises generally a first opening 84, and in the exemplary embodiment of FIG. 1, where the second resilient arm includes a second arm tab 72, the second wall member 90 also includes a second opening 94. The first and second wall members 80, 90 also include corresponding first and second wall engagement portions. FIG. 1 illustrates only the second wall engagement portion, which is in the form of a wall pin opening 96. The exemplary first wall engagement portion is configured similarly.

In FIG. 2, when the valve is in a first position in the housing, the first arm tab 62 is aligned with and preferably protrudes through the first opening 84 of the first wall member 80. The exemplary embodiment of FIG. 2 does not include a second arm tab, but in embodiments where a second arm tab protrudes from the second resilient arm, the second arm tab is also aligned with and preferably protrudes through a corresponding second opening of the second wall member when the valve is in the first position.

The first and second arm engagement members, pins 64 and 74 illustrated in FIG. 3, are aligned and engaged with the corresponding first and second wall engagement portions of the first and second wall members, respectively, when the valve is in the first position in the housing, so that the first and second resilient arms 60 and 70 are in the configuration illustrated in FIG. 2. FIG. 2 does not illustrate the first and second pins of the first and second resilient arms disposed in the corresponding pin openings of the first and second wall members to simplify the drawing. Thus engaged, the plate member 50, which is coupled to the first and second wall members, is rotationally fixed relative to the housing, which is coupled to the first and second resilient arms, as illustrated generally in FIG. 1.

Figure 4:
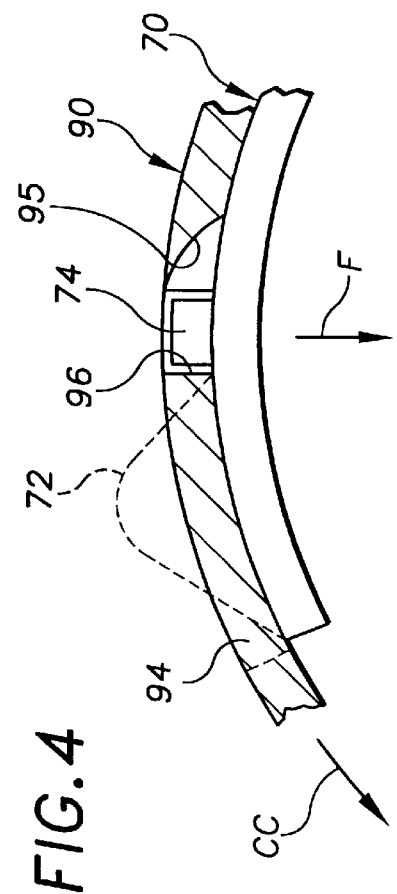
FIG. 4 is an enlarged view of a portion of an exemplary rotary valve actuator.

FIG. 4 illustrates a more detailed view of the second arm engagement member, which is the exemplary pin 74, aligned and engaged with the second engagement portion, which is the exemplary second pin opening 96 of the second wall member 90. The first pin of the first resilient arm is similarly aligned and engaged with the first pin opening of the first wall member when the valve is in the first position, as discussed above but not illustrated. For reference purposes, FIG. 4 also illustrates, in phantom lines, the location of the alternative second arm tab 72 disposed through the opening 94 of the second wall member 90 and its relation to the second pin 74 and the second pin opening 96 in the second wall member.

When the valve is in the first position in the housing illustrated in FIG. 2, the engagement of the first engagement member of the first arm with the first engagement portion of the first wall member prevents rotation of the actuator member and valve coupled thereto in the counter-clockwise direction about the pivot axis 32 relative to the housing. And, the engagement of the second engagement member of the second arm with the second engagement portion of the second wall member prevents rotation of the actuator member in the clockwise direction about the pivot axis relative to the housing, as viewed in FIG. 2.

In the exemplary rotary valve embodiment where the valve 30 is actuated by the motor 40, the second engagement member of the second resilient arm 70 prevents clockwise rotation of the actuator member 50 in the event that the valve is prevented from rotating from the first position illustrated in FIG. 2 to the second position illustrated in FIG. 3. For example, if an obstruction prevents the valve from rotating in the counter-clockwise direction upon actuation of the motor, the motor and the plate member 50 coupled thereto would tend to rotate in the clockwise direction unless the exemplary second engagement pin 74 of the second arm 70 is engaged with the exemplary pin opening 96 of the second wall member 90 as illustrated in FIG. 4 and discussed above. In other applications, however, the engagement member of the second resilient arm is not required.

In FIG. 3, generally, the first and second resilient arms 60, 70 are flexible away from the corresponding first and second wall members 80, 90 to disengage the first and second arm engagement members, or pins 64 and 74, from the corresponding first wall engagement portions, not illustrated in FIG. 3, to permit rotation of the valve from the first position illustrated in FIG. 2 to the second position illustrated in FIG. 3. More particularly, to rotate the actuator member and the valve coupled thereto in the counter-clockwise direction, the first arm tab 62 must be depressed to flex the first resilient arm 60 away from the first wall member 80 to disengage the first engagement member of the first resilient arm from the first engagement portion of the first wall member.

In embodiments having a second resilient arm 70 disposed about the pivot axis 32 in the opposite direction as the first resilient arm 60, as illustrated in the exemplary embodiment of FIG. 2, it is not necessary to first flex the second resilient arm 70 away from the second wall member 90 prior to rotating the actuator member and valve coupled thereto in the counter-clockwise direction. FIG. 4 illustrates, more particularly, that rotation of the actuator member and the second wall portion 90 coupled thereto in the counter-clockwise direction CC relative to the fixed second resilient arm 70 tends to flex the second resilient arm 70 in the direction F away from the second wall member. The reason is that the counter-clockwise rotating second wall member 90 applies a force to the pin 74, resulting in the application of a torque to the second resilient arm that flexes the second resilient arm 70 about its fixed end portion 71 and away from the second wall member. The torque occurs in the absence of any extraneous inwardly directed force on the second resilient arm as is require on the first resilient arm. The second arm tab thus is not required in the exemplary embodiment.

In a preferred embodiment, illustrated in FIG. 4, the second engagement portion, or pin opening 96, of the second wall member 90 includes a tapered surface 95 that facilitates the inwardly flexing of the second resilient arm 70 away from the second wall member 90 when the actuator member 50, illustrated in FIG. 1, and the second wall member coupled thereto are rotated in the counter-clockwise direction CC relative to the fixed second resilient arm 70. This configured, the pin 74 of the second resilient arm 70 tends to move more smoothly along the tapered surface 95 than it otherwise would as the second wall member 90 moves in the counter-clockwise direction CC and the second resilient arm is flexed away therefrom.

In the exemplary embodiments of FIGS. 2 and 3, the first and second wall members 80, 90 are part of a generally arcuate first sleeve member 100 protruding from the actuator member, not illustrated in FIGS. 2 and 3, and disposed about the valve pivot axis 32. FIG. 1 illustrates the sleeve member 100 coupled to and protruding from the plate member 50 of the actuator member.

FIGS. 2 and 3 also illustrate the first and second resilient arms 60, 70 as first and second arcuate portions of a second sleeve member 102 coupled to the housing 20. The second sleeve member 102 is disposed concentrically within the first sleeve member 100 so that the first and second resilient arms 60, 70 are disposed adjacent the corresponding inner sides 82, 92 of the first and second wall members 80, 90, respectively, as discussed above.

In an alternative embodiment, the first sleeve member 100 may be coupled to the housing so that the first and second wall members 80, 90 protrude from the housing instead of from the actuator member, and the second sleeve member 102 may be coupled to the actuator member so that the first and second resilient arms 60, 70 protrude from the plate member instead of from the housing as in the exemplary embodiment.

FIG. 1 illustrates first and second tabs 104, 106 protruding from the housing 20, and which are formed as a portion of the second sleeve member 102. The first and second tabs 104, 106 extend generally radially outwardly of the second sleeve member 102, and are disposed on a resilient stem so that the tabs are flexible inwardly to permit disposal of the actuator member and more particularly the first sleeve member 100 over and concentrically about the second sleeve member 102.

In FIGS. 2 and 3, after assembly of the first sleeve member 100 about the second sleeve member 102, the tabs 104, 106 are disposed over portions of the first sleeve member 100 thereby retaining the actuator member on the housing. FIG. 1 illustrates a first slot 98 disposed between a portion of the first sleeve member 100 and more particularly the second resilient arm 70 thereof and the plate member 50. A similar second slot, not illustrated in FIG. 1, is disposed between the first resilient arm and the plate member opposite the first slot 98. The first and second slots 98, 99 are illustrated in FIGS. 2 and 3, and permit rotation of the actuator member relative to the housing. In alternative embodiments, the actuator member may be coupled to the housing by other means.

Generally, the valve actuator is operated by rotating the actuator member in the clockwise or counter-clockwise directions. In the exemplary embodiment, rotation of the valve from the first position illustrated in FIG. 2 to the second position illustrated in FIG. 3 requires first depressing the first arm tab 62 to disengage the first engagement member of the first resilient arm from the first engagement portion of the first wall member. The first arm tab 62 preferably protrudes from the first wall member opening 84 where it is readily accessible, and may be depressed, for example manually with a finger or by other means. Thereafter, the actuator member and valve coupled thereto may be pivoted to the second position, for example by manual hand operation. A preferred embodiment for operating the rotary valve actuator is discussed further below.

In the exemplary embodiment, a first flexible member is coupled to the actuator member and is disposed in a first direction about the first wall member and over the first arm tab protruding through the first opening thereof. Upon applying tension to the first flexible member, the first flexible member engages and depresses the first arm tab to flex the first resilient arm away from the first wall member thereby disengaging the first arm engagement member from the first wall engagement portion, whereby the valve is pivotable from the first position to the second position. Preferably, a second flexible member is also coupled to the actuator member and is disposed about the second wall member, in a second direction opposite the first direction, to facilitate pivoting the valve from the second position back to the first position. Alternatively, the valve may be biased to the first position by a biasing means that returns the valve from the second position to the first position, thereby eliminating the necessity for the second flexible member.

In the exemplary fuel filler valve embodiment, the one or more flexible members required to operate the rotary valve actuator member may be readily located remotely from the rotary valve, for example in the passenger cabin or trunk space of the automobile, where they are operable manually to override the motor drive valve actuator as the need arises.

In the exemplary embodiment of FIG. 2, the first and second flexible members are first and second straps 110, 120 coupled to the actuator member and more particularly to the plate member thereof, for example by corresponding pins 51, 53 extending from the plate member. The plate member is not illustrated in FIGS. 2 and 3. FIG. 1 illustrates the plate member 50 having the second pin 53 extending therefrom. The first pin also protrudes from the plate member, but is not visible in FIG. 1. For clarity, the first and second straps are not illustrated in FIGS. 1 and 3. FIG. 2 illustrates the first and second straps 110, 120 extending from the pins 51, 53 about the pivot axis 32 in opposite directions. The one or more straps may be fed through or guided by one or more strap guides, for example first and second strap guides 14 and 16, whereby the straps are operable remotely from the rotary valve.

In FIG. 2, when the valve is in the first position, tension applied to the first strap 110 depresses the first arm tab 62 to flex the first resilient arm 60 inwardly away from the first wall member 80, whereby continued tension applied to the first strap rotates the actuator member and the first and second wall members 80, 90 coupled thereto to pivot the valve in the counter-clockwise direction to the second valve position illustrated in FIG. 3. When the valve is in the second position, illustrated in FIG. 3, tension applied to the second strap 120, not illustrated in FIG. 3, rotates the actuator member and the first and second wall members coupled thereto to pivot the valve in the clockwise direction to the first valve position illustrated in FIG. 2.

While the foregoing written description of the invention enables one of ordinary skill to make and use what is considered presently to be the best mode thereof, those of ordinary skill will understand and appreciate the existence of variations, combinations, and equivalents of the specific exemplary embodiments herein. The invention is therefore to be limited not by the exemplary embodiments herein, but by all embodiments within the scope and spirit of the appended claims.

What is claimed is:

1. A rotary valve actuator for actuating a valve pivotally disposed in a housing and movable about a pivot axis between first and second positions, comprising:
   an actuator member coupled to the valve;
   a first resilient arm coupled to the housing and disposed partially about the pivot axis, the first resilient arm having a first arm tab protruding therefrom, the first resilient arm having a first arm engagement member protruding therefrom;
   a first wall member coupled to the actuator member and disposed at least partially about the pivot axis, the first wall member having a first opening and a first wall engagement portion;
   the first resilient arm located adjacent the first wall member, between the pivot axis and the first wall member, the first arm tab aligned with the first opening when the valve is in the first position, the first arm engagement member engaged with the first wall engagement portion when the valve is in the first position,
   whereby the first resilient arm is flexible away from the wall member to disengage the first arm engagement member from the first wall engagement portion.

2. The rotary valve actuator of claim 1,
   a second resilient arm coupled to the housing and disposed partially about the pivot axis,
   a second arm engagement member protruding from the second resilient arm;
   a second wall member coupled to the actuator member and disposed at least partially about the pivot axis, the second wall member having a second wall engagement portion;
   the second resilient arm located adjacent the second inner side of the second wall member, between the pivot axis and the second wall member, the second arm engagement member engaged with the second wall engagement portion when the valve is in the first position.

3. The rotary valve actuator of claim 2, the first resilient arm extends in a first direction about the pivot axis, the second resilient arm extends in a second direction, opposite the first direction, about the pivot axis.

4. The rotary valve actuator of claim 2, the first and second wall members form a generally arcuate sleeve member, the first resilient arm is a first arcuate member extending in a first direction about the pivot axis, the second resilient arm is a second arcuate member extending in a second direction about the pivot axis, opposite the first direction.

5. The rotary valve actuator of claim 4, the valve has a valve coupling portion accessible through an opening of the housing, the actuator member has a plate member coupled to the valve coupling portion, the sleeve member is coupled to the plate member.

6. The rotary valve actuator of claim 5, the first arm tab protrudes through the first opening of the first wall member when the valve is in the first position, a first strap coupled to the actuator member and disposed in a first direction about an outer side of the sleeve member and over the first arm tab protruding through the first opening.

7. The rotary valve actuator of claim 6, a second strap coupled to the actuator and disposed in a second direction about the outer side of the sleeve member, opposite the first direction.

8. The rotary valve actuator of claim 7, the first arm tab is separate from the first arm engagement member.

9. The rotary valve of claim 7, the first arm engagement member is a first pin protruding outwardly from the first resilient arm and the first wall engagement portion is a first pin opening in the first wall member, the second arm engagement member is a second pin protruding outwardly from the second resilient arm and the second wall engagement portion is a second pin opening in the second wall member, the first pin disposed in the first pin opening and the second pin disposed in the second pin opening when the valve is in the first position.

10. The rotary valve actuator of claim 1, the first arm tab protrudes through the first opening when the valve is in the first position, a first flexible member coupled to the actuator member and disposed about the first wall member and over the first arm tab protruding through the first opening of the first wall member, the first flexible member engageable with the first arm tab, whereby the first resilient arm is flexible away from the first wall member to disengage the first arm engagement member from the first wall engagement portion so that the valve is pivotable from the first position to the second position.

11. The rotary valve actuator of claim 1, the first arm tab is separate from the first arm engagement member.

12. A rotary valve actuator for actuating a rotary fuel filler valve having a valve pivotally disposed in a housing and movable between first and second positions, comprising:
    a first strap coupled to the valve and disposed about a pivot axis thereof in a first direction;
    a second strap coupled to the valve and disposed about the pivot axis thereof in a second direction, opposite the direction of the first strap;
    a first resilient arm coupled to one of the housing or the valve, the first resilient arm having a first arm tab protruding therefrom and a first arm engagement member protruding therefrom;
    a first wall member coupled to the one of the housing or the valve to which the first resilient arm is not coupled, the first wall member having a first opening, a first inner side, a first outer side, and a first wall engagement portion;
    the first resilient arm located adjacent the first inner side of the first wall member, the first arm tab protruding through the first opening and the first arm engagement member engaged with the first wall engagement portion when the valve is in the first position,
    the first strap disposed about the first outer side of the first wall member and over the first arm tab protruding through the first opening, the first strap engageable with the first arm tab to disengage the first arm engagement member from the first wall engagement portion, whereby the valve is pivotable from the first position to the second position.

13. The rotary valve actuator of claim 12,
    a second resilient arm coupled to one of the housing or the valve, the second resilient arm having a second arm engagement member protruding therefrom;
    a second wall member coupled to the one of the housing or the valve to which the second resilient arm is not coupled, the second wall member having a second inner side, a second outer side, and a second wall engagement portion;
    the second resilient arm located adjacent the second inner side of the second wall member, the second arm engagement member engaged with the second wall engagement portion when the valve is in the first position,
    the second strap is disposed about the second outer side of the second wall member,
    the second resilient arm is flexible away from the inner side of the second wall member to disengage the second arm engagement member from the second wall engagement portion when the valve is rotated from the first position to the second position.

14. The rotary valve actuator of claim 13, the first resilient arm extends in a first direction about the pivot axis of the valve, the second resilient arm extends in a second direction, opposite the first direction, about the pivot axis of the valve.

15. The rotary valve actuator of claim 14, a powered valve actuator coupled to an actuator member, the powered valve actuator coupled to the valve, the first and second straps coupled to the actuator member.

16. The rotary valve actuator of claim 15, the actuator member comprises a plate member, the powered valve actuator is coupled to the valve through an access opening of the housing, the first and second resilient arms are coupled to the housing, and the first and second wall members are coupled to the plate member.

17. A rotary fuel filler valve comprising:
    a housing having a receptacle;
    a valve pivotally disposed in the receptacle of the housing, the valve pivotal about a pivot axis between first and second positions;
    an actuator member coupled to the valve;
    a first resilient arm coupled to one of the housing or to the actuator member, the first resilient arm having a first arm tab protruding therefrom and a first arm engagement member protruding therefrom;
    a first wall member coupled to the one of the housing or the actuator member to which the first resilient arm is not coupled, the first wall member having a first opening, a first inner side, and a first wall engagement portion;
    the first resilient arm located adjacent the first inner side of the first wall member, between the pivot axis of the valve and the first wall member, the first arm tab aligned with the first opening and the first arm engagement member engaged with the first wall engagement portion when the valve is in the first position.

18. The rotary valve of claim 17, the first arm tab protrudes through the first opening of the first wall member when the valve is in the first position, a first flexible member coupled to the actuator member and disposed about the first wall member and over the first arm tab protruding through the first opening thereof.

19. The rotary valve of claim 17,
a second resilient arm coupled to one of the housing or the actuator member, the second resilient arm having a second arm engagement member protruding therefrom;
a second wall member coupled to the one of the housing or the actuator member to which the second resilient arm is not coupled, the second wall member having a second inner side and a second wall engagement portion;
the second resilient arm located adjacent the second inner side of the second wall member, between the pivot axis of the valve and the second wall member, the second arm engagement member engaged with the second wall engagement portion when the valve is in the first position,
the first resilient arms extends in a first direction about the pivot axis of the valve, and the second resilient arm extends in a second direction, opposite the first direction, about the pivot axis of the valve.

20. The rotary valve of claim 19, the first arm tab protrudes through the first opening when the valve is in the first position, a first strap coupled to the actuator member and disposed in a first direction about the valve pivot axis, the first strap disposed about the first wall member and over the first arm tab protruding through the first opening thereof, a second strap coupled to the actuator member and disposed in a second direction about the valve pivot axis, opposite the first direction of the first strap.

* * * * *